United States Patent
Li et al.

(10) Patent No.: US 9,939,541 B2
(45) Date of Patent: Apr. 10, 2018

(54) LAYERED LINEAR INVERSION TECHNIQUES FOR LOCATING MICROSEISMIC ACTIVITY

(71) Applicant: Chevron U.S.A. Inc., San Ramon, CA (US)

(72) Inventors: Chang Li, Katy, TX (US); Sudipta Sarkar, Moon Township, PA (US); Chunquan Yu, Cambridge, MA (US)

(73) Assignee: Chevron U.S.A. Inc., San Ramon, CA (US)

( * ) Notice: Subject to any disclaimer, the term of this patent is extended or adjusted under 35 U.S.C. 154(b) by 417 days.

(21) Appl. No.: 14/593,368

(22) Filed: Jan. 9, 2015

(65) Prior Publication Data
US 2016/0202371 A1    Jul. 14, 2016

(51) Int. Cl.
| | | |
|---|---|---|
| G01V 1/00 | (2006.01) | |
| G01V 1/28 | (2006.01) | |
| G01V 1/30 | (2006.01) | |
| E21B 43/26 | (2006.01) | |
| G01V 1/50 | (2006.01) | |

(52) U.S. Cl.
CPC ............ *G01V 1/288* (2013.01); *E21B 43/26* (2013.01); *G01V 1/282* (2013.01); *G01V 1/305* (2013.01); *G01V 1/50* (2013.01); *G01V 2210/123* (2013.01); *G01V 2210/1234* (2013.01); *G01V 2210/1429* (2013.01); *G01V 2210/65* (2013.01); *G01V 2210/66* (2013.01)

(58) Field of Classification Search
CPC .......... E21B 43/26; G01V 1/288; G01V 1/50; G01V 1/282; G01V 1/305; G01V 2210/1234; G01V 2210/65; G01V 2210/1429; G01V 2210/123; G01V 2210/66
See application file for complete search history.

(56) References Cited

U.S. PATENT DOCUMENTS

| | | | |
|---|---|---|---|
| 4,516,206 A | 5/1985 | McEvilly | |
| 7,457,195 B2* | 11/2008 | Jones | .................. G01V 1/008 367/38 |
| 7,986,587 B2 | 7/2011 | Duncan et al. | |

(Continued)

FOREIGN PATENT DOCUMENTS

CN    102053270 A    5/2011

OTHER PUBLICATIONS

Li et al., "Accurate Microseismic Event Location Inversion Using a Gradient-Based Method", SPE Annual Technical Conference and Exhibition, San Antonio, TX, USA Oct. 6-10, 2012.*

(Continued)

*Primary Examiner* — Krystine E Breier
(74) *Attorney, Agent, or Firm* — Andrew J. Lagatta; Melissa M. Hayworth; Marie L. Clapp

(57) ABSTRACT

A method for locating a microseismic event in a subsurface formation, in some embodiments, comprises: receiving a microseismic signal at a detector; obtaining a velocity model representative of the subsurface formation, the velocity model comprising multiple velocity layers; estimating, for each of the multiple velocity layers in the subsurface formation, a microseismic event location and a microseismic event origin time; and selecting one of the estimated locations and times using a parameter of the microseismic signal received at the detector.

20 Claims, 4 Drawing Sheets

(56) References Cited

U.S. PATENT DOCUMENTS

| | | | |
|---|---|---|---|
| 8,064,288 B2 | 11/2011 | Liang et al. | |
| 8,498,845 B2 | 7/2013 | Jing et al. | |
| 2005/0190649 A1* | 9/2005 | Eisner | G01V 1/40 367/38 |
| 2009/0010104 A1 | 1/2009 | Leaney | |
| 2009/0164186 A1 | 6/2009 | Haase et al. | |
| 2012/0051178 A1* | 3/2012 | Zhang | G01V 1/288 367/50 |
| 2013/0215717 A1 | 8/2013 | Hofland et al. | |
| 2013/0265851 A1 | 10/2013 | Faber et al. | |
| 2016/0320504 A1* | 11/2016 | Lindgaard | G01V 1/30 |

OTHER PUBLICATIONS

PCT International Search Report and Written Opinion, International App. No. PCT/US2015/063331, dated Aug. 3, 2016.

N. R. Warpinski et al., Improved Microseismic Fracture Mapping Using Perforation Timing Measurements for Velocity Calibration, SPE 84488, Oct. 8, 2002, pp. 3833-3843, XP008060149.

Fischer, T., et al.; "Microseismic Signatures of Hydraulic Fracture Growth in Sediment Formations: Observations and Modeling"; Feb. 2008, Journal of Geophysical Research, vol. 113, B02307, pp. 1-12.

Kim, Hee Joon, et al.; "Inequality Constraint in Least-Squares Inversion of Geophysical Data"; Earth Planets Space, Feb. 1999, vol. 51, pp. 255-259.

Li, Gaoming, et al.; "Accurate Microseismic Event Location Inversion Using a Gradient-Based Method"; Oct. 2012, SPE 159187, pp. 1-12.

Pennington, Wayne D., et al.; "Calibration of Seismic Attributes for Reservoir Characterization"; Final Technical Report, Michigan Technological University, Oct. 2002, pp. 1-60.

Pennington, Wayne D., et al.; "Calibration of Seismic Attributes for Reservoir Characterization"; Final Technical Report, Michigan Technological University, Oct. 2002, pp. 61-120.

Pennington, Wayne D., et al.; "Calibration of Seismic Attributes for Reservoir Characterization"; Final Technical Report, Michigan Technological University, Oct. 2002, pp. 121-185.

Wong, Joe, et al.; "Microseismic Hypocenter Location Using Non-linear Optimization"; published on Apr. 5, 2010; downloaded from the internet: https://www.crewes.org/ForOurSponsors/ConferenceAbstracts/2010/SEG/Wong_SEG_2010.

PCT International Prliminary Report on Patentability, International App. No. PCT/US2015/063331, dated Jul. 11, 2017, pp. 1-9.

\* cited by examiner

LAYERED LINEAR INVERSION TECHNIQUES FOR LOCATING MICROSEISMIC ACTIVITY

BACKGROUND

A technique known as "fracturing," or "fracking," is often used to increase the permeability of shale or other low-permeability formations so that hydrocarbons may be more easily extracted from the formation. Fracking typically involves perforating the casing of a wellbore (e.g., using a perforation gun) and injecting water or other fluid into the formation at very high pressures, thereby opening existing fractures and creating new ones in the formation. The fractures initially form in the general vicinity of the perforations and propagate outwardly from the well. The directional tendency of such fracture propagation can often be predicted based on an analysis of the composition and stress fields in the formation, yet the precise placement and extent of the resulting fractures remains unpredictable. Techniques that are commonly used to model or estimate the precise locations of fractures are computationally intensive and thus tedious and time-consuming. In some cases, they are inaccurate and, therefore, unreliable as a means for evaluating the effectiveness of the fracking job or tracking any kind of microseismic activity.

SUMMARY

To address these issues, there are disclosed herein various systems and methods employing layered linear inversion techniques for locating microseismic activity. At least some of these embodiments are directed to a method for locating a microseismic event in a formation that comprises receiving a microseismic signal at a detector; obtaining a velocity model representative of the subsurface formation, the velocity model comprising multiple velocity layers; estimating, for each of the multiple velocity layers in the subsurface formation, a microseismic event location and a microseismic event origin time; and selecting one of the estimated locations and times using a parameter of the microseismic signal received at the detector. Such embodiments may be supplemented in a variety of ways, including by adding any of the following concepts or steps in any sequence and in any combination: wherein said estimating comprises performing an inversion process for each of said multiple velocity layers; wherein performing said inversion process comprises determining an event location and an event origin time that produce a misfit that meets or falls below a predetermined threshold; further comprising using a location of a perforation shot in a well to perform said inversion process; further comprising using a depth in the middle of at least one of the multiple velocity layers to perform said inversion process for said at least one of the multiple velocity layers; wherein performing the inversion process for at least one of said multiple velocity layers comprises using the inversion model ax=b, wherein "a" comprises a sensitivity matrix associated with said at least one of the multiple velocity layers, "x" comprises a vector that includes the estimated location and time for said at least one of the multiple velocity layers, and "b" includes an arrival time vector that includes a calculated arrival time for the microseismic signal; wherein the parameter comprises an arrival time of the received microseismic signal at the detector, and wherein said selecting comprises determining an absolute value of a difference between said arrival time and a calculated arrival time; further comprising using the selected one of the estimated locations and times to calculate the calculated arrival time; and wherein said detector comprises a geophone.

At least some of the embodiments are directed to a method for locating a microseismic event that comprises lowering a microseismic detector into a well in a formation; using the microseismic detector to receive a microseismic signal generated by the microseismic event, the signal received at an arrival time; for each of multiple velocity layers within the formation, performing a linear inversion to estimate spatial coordinates of the microseismic event and an event origin time of the microseismic event; and selecting from among the estimated spatial coordinates and event origin times based on a difference between the arrival time and an expected arrival time associated with the selected estimated spatial coordinates and event origin time. Such embodiments may be supplemented in a variety of ways, including by adding any of the following concepts or steps in any sequence and in any combination: wherein performing the linear inversion for at least one of the multiple velocity layers comprises: initializing a depth component of the estimated spatial coordinates to a midpoint of said at least one of the multiple velocity layers, and initializing non-depth components of the estimated spatial coordinates to a location associated with a casing perforation in another well; wherein performing the linear inversion for at least one of the multiple velocity layers comprises repeatedly modifying the estimated spatial coordinates and event origin time; wherein performing the linear inversion for at least one of the multiple velocity layers comprises constraining a depth component of the estimated spatial coordinates to said at least one of the multiple velocity layers; and wherein performing said linear inversion comprises using an inversion model of ax=b, wherein "a" comprises a matrix associated with a velocity model, "x" comprises a vector containing the estimated spatial coordinates and event origin time, and "b" comprises a vector containing expected arrival times for compression waves and shear waves forming the microseismic signal.

At least some of the embodiments are directed to a system to determine a location and time of a microseismic event in a formation. The system comprises a microseismic detector to determine an arrival time of a microseismic signal generated by the event; and processing logic, in communication with the tool, to estimate a time and location of the event for each of a plurality of velocity layers in the formation. The processing logic uses the arrival time to select one of the estimated times and one of the estimated locations. Such embodiments may be supplemented in a variety of ways, including by adding any of the following concepts in any sequence and in any combination: wherein the microseismic detector comprises one or more geophones; wherein the microseismic detector is disposed in a location selected from the group consisting of a well within said formation and a surface of said formation; wherein the processing logic estimates said times and locations using a linear inversion model that accounts for properties of said plurality of velocity layers; wherein, to select said one of the estimated times and locations, the processing logic calculates an absolute value difference between said arrival time and a calculated arrival time for each of the plurality of velocity layers in the formation; and wherein, to select said one of the estimated times and locations, the processing logic identifies the lowest absolute value difference among the absolute value differences calculated for each of the plurality of velocity layers in the formation.

Figure 1:
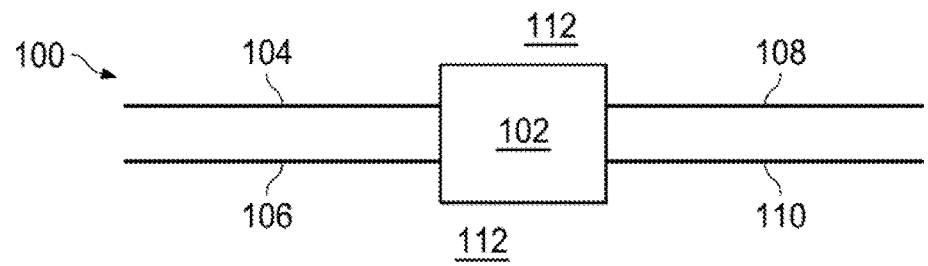
FIG. 1 is a map view of an illustrative drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein is a layered linear inversion technique that may be used to accurately and efficiently identify the location and timing of a microseismic event in a formation. The technique entails receiving a microseismic signal with a detector array disposed within a monitoring well, and estimating a location and a time of the microseismic event for each of multiple velocity layers using an inversion model. The technique also includes calculating, for each of the estimated locations and times, a difference between an expected signal arrival time and the time that the signal actually arrived at each of the detectors. Finally, the technique entails selecting one of the estimated locations and times based on the calculated mismatch. The selected location is the most likely point in the formation at which the microseismic event occurred, and the selected time is the most likely time at which the event occurred.

FIG. 1 is a schematic map view of an illustrative drilling environment 100 in which the layered linear inversion technique described herein may be performed. The drilling environment 100 includes a pad 102 and multiple directional wells 104, 106, 108 and 110 drilled within a formation 112. In some embodiments, each of the wells is curved in at least two dimensions (e.g., with a vertical and a horizontal component), and in other embodiments, one or more of the wells is straight (e.g., strictly vertical). Although FIG. 1 depicts four illustrative wells, any suitable number of wells may be used to implement the layered inversion technique described herein. For instance, in some embodiments, a pair of wells is used: one well where the hydraulic fracturing is performed, inducing a series of microseismic events whose location and timing is to be identified, and a monitoring well to accommodate a string of microseismic detectors (e.g., geophones) to identify the location and timing of the event as described in detail below. In other embodiments, a single well may be used—for instance, to perform the drilling or fracturing activity that generates the microseismic events, with the detector array on the surface or in an acoustically isolated portion of the well. Alternatively, the microseismic activity may be on the surface (e.g., mudslide) and a single monitoring well employed for tracking the microseismic event locations and timing. In yet other embodiments, no wells are used at all. The pad 102 may be adapted for use as necessary. During a drilling phase, the pad may be adapted to include drilling equipment, and during a wireline exploration phase, the pad may be adapted to include wireline equipment (e.g., such as that described with respect to FIG. 3, below).

Figure 2:
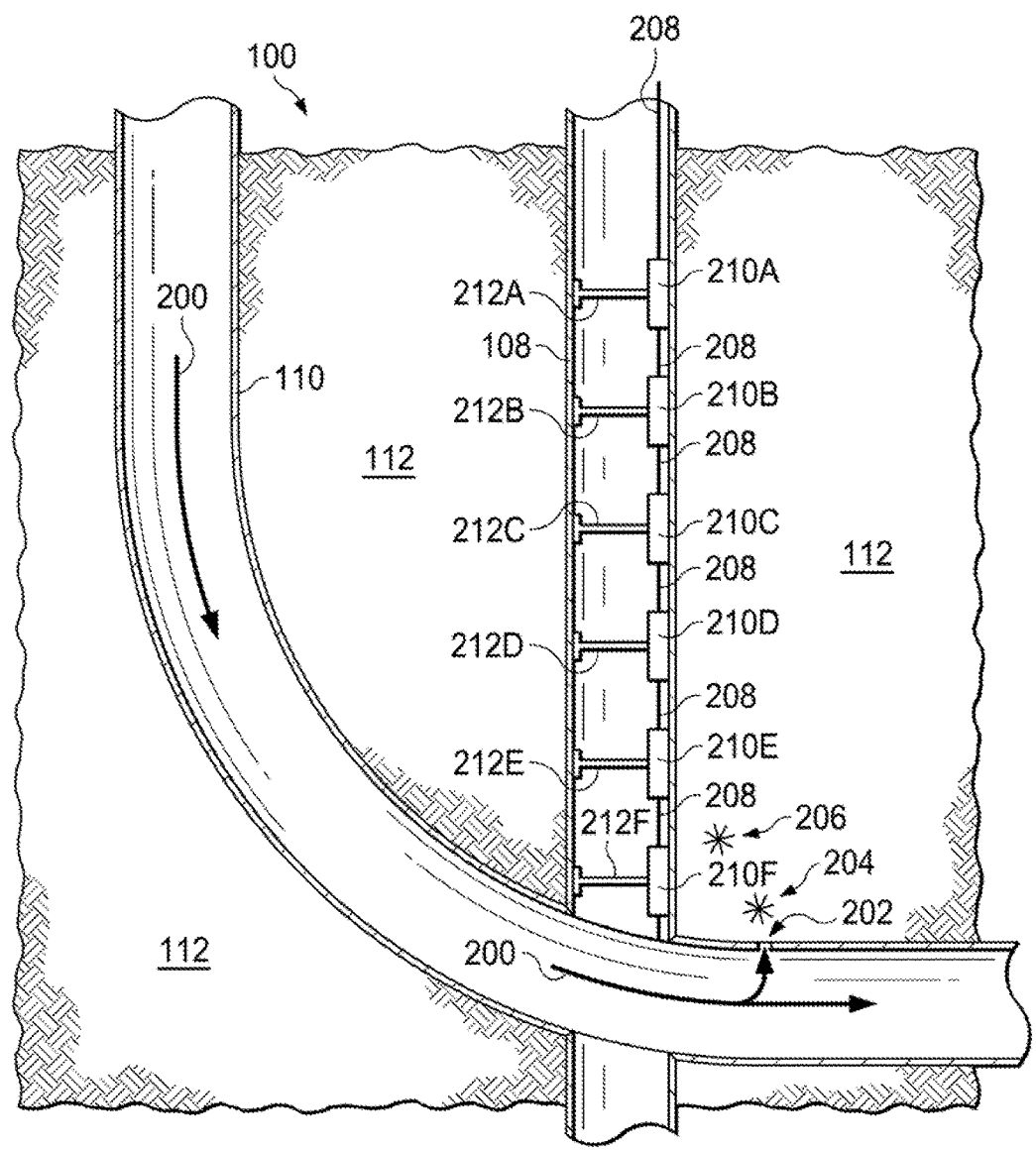
FIG. 2 is a schematic of a hydraulic fracturing well with microseismic detectors disposed within a nearby monitoring well.

FIG. 2 is a side view of the illustrative drilling environment 100. As FIG. 2 depicts, the environment 100 includes proximate wells 108, 110, which may be spaced any suitable distance apart from each other (e.g., 20-2000 meters apart). The wells 108, 110 as shown are completed and cased wells, although casing strings, cement sheaths and the like are not specifically shown in FIG. 2. The wells 108, 110 are both curved (though the horizontal component of well 108 is not expressly illustrated in FIG. 2), but in some embodiments, one or both of the wells 108, 110 may be straight. The well 108 includes a string of microseismic detectors (e.g., geophones) 210A-210F suspended within the well 108 by a logging cable 208 that provides power and communications between the detectors and surface-level processing logic (e.g., computers). In addition to detectors 210A-210F, the well 108 includes another detector, which in FIG. 2 is hidden behind the well 110. In some embodiments, the detectors 210A-210F are pressed against the wall of the well using contralaterally extended arms 212A-212F, respectively, so that the detectors may detect microseismic signals.

In operation, a hydraulic fracturing operation is performed within the well 110 to generate one or more microseismic events within the formation 112. Specifically, once the well 110 has been drilled and cased, a perforation tool (e.g., a perforation gun) capable of perforating the casing string and cement layer in one or more predetermined locations is lowered into the well 110. A stiff tubing string or a tractor may be used to navigate the perforation tool through non-vertical portions of the well 110. Once the perforation tool is properly positioned to create a perforation in the casing at a predetermined location, the tool is fired, thereby creating one or more such perforations. Often the perforation tool will be accompanied by packers that isolate the zone around the perforation and a fluid injector for directing the fracking fluid into the formation, although alternative fracturing techniques are also suitable and may be employed.

FIG. 2 shows an illustrative perforation 202 in the wall of the well 110. The perforation 202 is merely illustrative; in practice, a perforation tool may be used to simultaneously create multiple perforations at a time. The perforation 202 extends from the interior free space of the well 110 and penetrates through any layers disposed between the free space and the formation 112 (including, e.g., casing and cement). Once the perforation has been made, the perforation tool is withdrawn from the well 110. Fluid (e.g., a mixture including water and proppant) is then injected with high pressure into the well 110, as arrows 200 indicate. Again, the injection of high-pressure fluid through the perforation 202 via the well 110 is illustrative; in practice, the well may have multiple perforations, and each perforation or group of perforations may be isolated in turn so that the travel path of injected fluid is controlled. At least some of the fluid is diverted into the perforation 202. Because the fluid passes through the perforation 202 at such high pressure, it creates fractures within the formation, such as fracture 204.

Often, however, fractures are not spatially limited to areas in the immediate vicinity of the perforation 202. It is desirable in many cases to extend a particular fracture as deeply as possible into the formation (so long as the fracture does not disturb other fractures or wells), thereby maximizing potential hydrocarbon yield. As shown in FIG. 2, for instance, high-pressure fluid injected during a hydraulic fracturing process induces not only the fracture 204 but also a fracture 206 located farther away from the perforation 202. Because such fractures may be induced in various parts of the formation 112 and not always strictly adjacent to the perforation 202, the layered linear inversion technique described herein is used to identify the locations of such fractures (e.g., fracture 206) and the times at which they are generated. Specifically, the linear inversion technique leverages the microseismic energy that is generated when a fracture is induced to locate and time the source of the microseismic event and, thus, the location of the fracture and the time at which it was induced. The scope of this disclosure is not limited to using the layered linear inversion technique to detect the location and timing of hydraulic fracturing-related microseismic activity. On the contrary, the technique may be used to identify the location and timing of any microseismic activity occurring within the formation 112.

Figure 3:
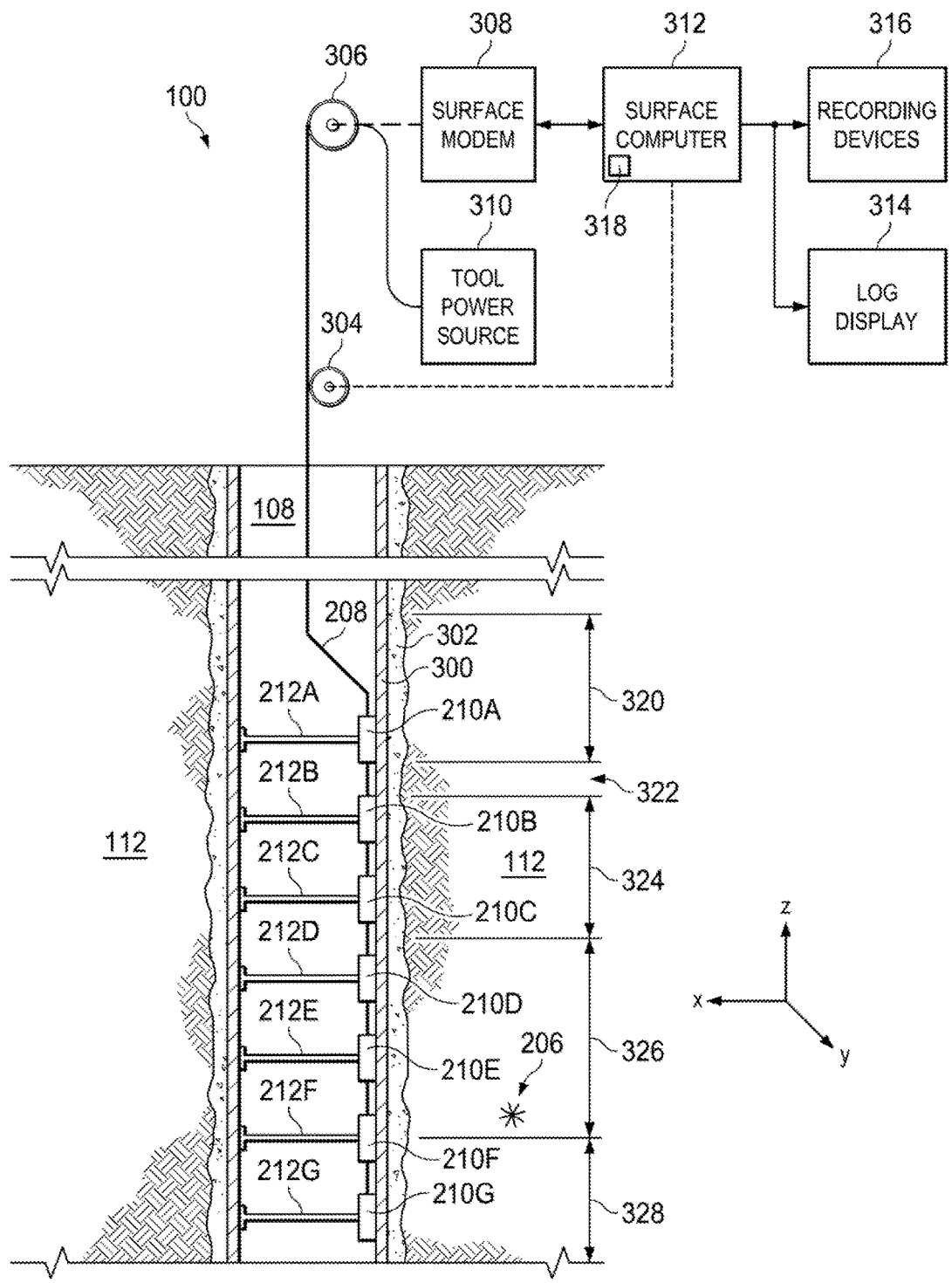
FIG. 3 is a schematic view of the monitoring well.

FIG. 3 is a more detailed schematic of the monitoring well environment 100. To better illustrate how the layered linear inversion technique is performed, the well 110 is omitted, and only well 108 and surface equipment used in tandem with microseismic detectors disposed within well 108 are shown. The environment 100, as depicted in FIG. 3, includes the well 108 disposed within the formation 112 and having a cement sheath 302 positioned between a casing string 300 and the formation 112. Logging cable 208 suspends the string of microseismic detectors 210A-210G within the well 108. In some embodiments, each detector 210A-210G may couple to an arm 212A-212G, respectively, that extends against one side of the well's wall such that the detector is pressed to the opposing side of the wall. In some embodiments, the detectors may be disposed within the cement sheath 302. A sheave 304 guides the logging cable 208 into the well 108. Logging cable 208 is spooled on a cable reel 306 or drum for storage. Logging cable 208 couples with the detectors and is spooled out or taken in to raise and lower the string of detectors in well 108. Conductors in the logging cable 208 connect with surface-located equipment, which may include a DC power source 310 to provide power to the detectors; a surface communication module 308 having an uplink communication device, a downlink communication device, a data transmitter and a data receiver; a surface computer 312 (or, more generally, any suitable type of processing logic), a logging display 314 and one or more recording devices 316. Sheave 304 may be coupled in any suitable manner to an input to surface computer 312 to provide detector depth measuring information.

The surface computer 312 includes processing logic (e.g., one or more processors) and has access to software (e.g., software 318) that enables the computer 312 to perform, assisted or unassisted, one or more aspects of the technique described herein. The computer 312 may provide an output for the logging display 314 and the recording devices 316. Recording device 316 is included to make a record of data collected from the geophones as a function of depth in the well 108.

The environment 100 also includes the fracture 206. As previously explained, the fracture 206 is merely illustrative of one type of microseismic energy-generating source, the location of which may be identified using the technique described herein. The technique is not limited to detecting the location of microseismic events generated by hydraulic fracturing. In most cases, however, the technique should be performed during the time period in which microseismic energy is being generated by the source (e.g., during a hydraulic fracturing operation). Finally, the formation 112 is divided into velocity layers 320, 322, 324, 326 and 328 to facilitate performance of the disclosed technique. The manner in which the velocity layers are identified and used to perform the disclosed technique is described below with respect to FIG. 4.

Figure 4:
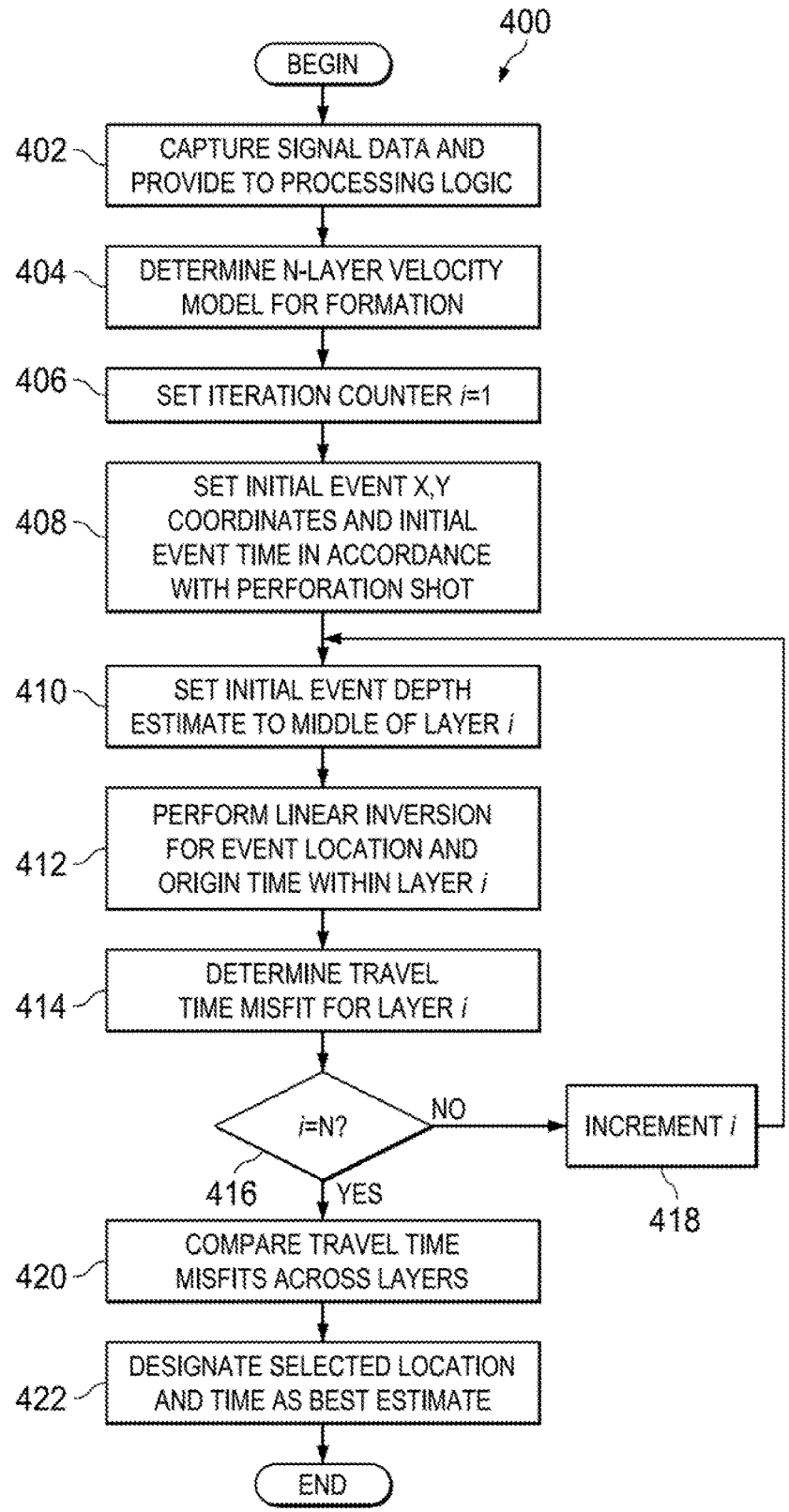
FIG. 4 is a flow diagram of an illustrative method for locating microseismic activity.

FIG. 4 is a flow chart of a method 400 describing the layered linear inversion technique. The method 400 is described with simultaneous reference to both FIGS. 3 and 4. The method 400 begins with using the microseismic detectors 210A-210G to detect incoming microseismic signals and to collect and provide information pertaining to the signals (including, e.g., arrival times and directions of the signals determined using hodograms, particle motions and/or a moveout) to processing logic (e.g., surface computer 312) that processes the information as described by the remainder of method 400 (step 402). Processing logic may determine signal arrival times either automatically or with human intervention. In some embodiments, for instance, processing logic determines the short term average (STA) and long term average (LTA) of the amplitude of the signal and calculates a ratio of STA to LTA. The point in time at which the ratio exceeds a pre-defined threshold ratio is determined to be the arrival time. In other embodiments, a person skilled in the art may visually inspect the arrived signal and may determine—in some cases, aided by computer filtering techniques (e.g., band-pass filtering)—the time at which the signal first arrived at the detector.

The method 400 then includes determining a velocity model for the formation 112 (step 404). A velocity model is a representation of at least part of the formation 112 that is divided into multiple horizontal layers, each layer corresponding to a different velocity. Various types of data, known to those of ordinary skill in the art, may be used to determine a velocity model. These data include, without limitation, sonic logs, check-shot data and seismic data that have been collected in the well 108 prior to performance of the layered linear inversion technique. Such data may be analyzed and converted to a layered velocity model using software tools such as GEOLOG® by PARADIGM® or PETREL® by SCHLUMBERGER®. Velocity data is typically represented on a log and one of ordinary skill will be familiar with the techniques used to interpret the log for the purpose of identifying velocity layers within the formation 112. Furthermore, the portion of the formation 112 for which velocity layers should be identified may vary based on the spatial diversity of data collected by the microseismic detectors. Stated another way, if a particular detector in the well 108 collects signal data of an acceptable quality level as determined by one of ordinary skill, then the velocity model should account for the areas of the formation 112 through which that signal data traveled. Whether a particular portion of the formation 112 carried a signal to a particular detector may be determined by identifying the general direction from which data arrived at the detector (e.g., by determining a moveout using that detector and adjacent detectors). In FIG. 3, illustrative velocity layers 320, 322, 324, 326 and 328 have been identified, but the scope of disclosure is not limited to any particular number of layers.

The method 400 also includes performing an iterative linear inversion routine that is repeated N times, where N is equal to the number of velocity layers identified in step 404. One purpose of the iterative inversion routine (which spans steps 410, 412, 414, 416 and 418) is to determine, for each velocity layer, the three-dimensional, spatial coordinates of the location that is the most likely source of the microseismic event being analyzed, as well as the time at which the microseismic event occurred. A linear inversion model (described in detail below) that accounts for the x, y and z spatial coordinates of the microseismic event location and that accounts for the event origin time to is used to determine these coordinates and event origin time.

Specifically, the inversion model uses the velocity model, together with estimated spatial coordinates and event origin time to calculate, for each detector, an expected arrival time of the microseismic waves. These estimated spatial coordinates and event origin time are repeatedly refined until the model produces a set of arrival times for microseismic waves at the detectors that match (or closely approximate within an acceptable margin of error) the set of actual arrival times of the microseismic waves at the detectors. The quality of the match may be determined using a mean squared error calculation, and the coordinates that minimize the mean squared error may be taken as the best match.

The absolute value difference between a calculated arrival time and an actual arrival time is termed a "misfit." The specific set of spatial coordinates and event origin time that produces the smallest misfit is identified for each velocity layer. This smallest misfit for a particular velocity layer is termed a "velocity layer minimum misfit." The smallest velocity layer minimum misfit across all velocity layers is then identified, and this misfit is referred to as the "global minimum misfit." The set of spatial coordinates and event origin time that corresponds to the global minimum misfit is determined to be the location and event origin time of the microseismic event in question. The mathematical linear inversion model that is used in the iterative inversion routine (which, as noted above, spans steps 410, 412, 414, 416 and 418) is now described, followed by a more detailed description of the routine itself.

In at least some embodiments, the following linear inversion model is used:

$$ax = b \quad (1)$$

where "a" represents a sensitivity matrix that accounts for a partial derivative of the arrival times with respect to the location coordinates (x, y, z) and origin time ($t_0$) in the layer for which the inversion is being performed, "x" represents a vector that accounts for updates of the x, y, and z coordinates of the microseismic event as well as the event origin time to for each iteration, and "b" represents a vector of misfits between measured (at microseismic detectors) and calculated (using x,y,z,$t_0$) arrival times. More specifically, and using an illustrative embodiment in which four microseismic detectors are deployed to detect microseismic waves, an expanded view of the inversion model may be as follows:

$$\begin{bmatrix} a_{1,1} & \cdots & a_{1,4} \\ \vdots & \ddots & \vdots \\ a_{4,1} & \cdots & a_{44} \end{bmatrix} \begin{bmatrix} \Delta x \\ \Delta y \\ \Delta z \\ \Delta t_0 \end{bmatrix} = \begin{bmatrix} \Delta t_1 \\ \Delta t_2 \\ \Delta t_3 \\ \Delta t_4 \end{bmatrix} \quad (2)$$

where matrix "a" (also known as the "sensitivity matrix") is the partial derivative matrix of arrival times with respect to the variables x, y, z and $t_0$. As explained, vector "x" contains updates of the x, y and z coordinates ($\Delta x$, $\Delta y$, $\Delta z$) of the microseismic event and an update of event origin time $t_0$ ($\Delta t_0$). Vector "b" contains the misfits between measured and calculated arrival times for microseismic waves at four detectors ($\Delta t_1$, $\Delta t_2$, $\Delta t_3$, $\Delta t_4$). (Although the figures depict seven detectors 210A-210G in well 108, the inversion model as provided in equation (2) assumes only four detectors for ease of explanation and clarity.) Each detector receives two different signals—a microseismic p-wave (i.e., compression wave) and a microseismic s-wave (i.e., shear wave). In some embodiments, only p-wave arrival times are used in vector "b," and in other embodiments, only s-wave arrival times are used in vector "b." The remainder of this discussion assumes the use of both p-wave and s-wave arrival times.

Referring again to FIGS. 3 and 4, prior to commencing the iterative portion of the method 400, the method includes setting an iteration counter i to 1 (step 406). The iteration counter i corresponds to the velocity layer for which the linear inversion is being performed. Because the formation 112 contains five velocity layers, the counter i will increment from 1 to 5 before the iterative portion of the method 400 is complete. Also prior to beginning the iterative portion of method 400, the initial x, y coordinates for the microseismic event are set at the location where the perforation (e.g., perforation 202) was made in the well 110 (step 408). Similarly, the event origin time to is set to the most likely time that the microseismic event is estimated to have occurred (e.g., based on the time that the high-pressure fluid is estimated to have passed through the perforation) (step 408). If the microseismic event of interest was not induced by a controlled action, such as a perforation during a fracturing process, then a best estimate using all available data may be used to set the initial values for x, y and $t_0$.

The iterative portion of the method 400 begins with setting the initial depth estimate of the event to the middle of layer i (step 410). Examining FIG. 3, for instance, and assuming that i=1, the initial depth estimate of the event is set to the middle of layer 320. The method then includes repeatedly modifying the x, y, z and $t_0$ values in the inversion model described above within the bounds of layer 320 (step 412) until the L2-norm of misfit vector b is minimized or at least meets or falls below a predetermined threshold value (step 414).

Figure 5:
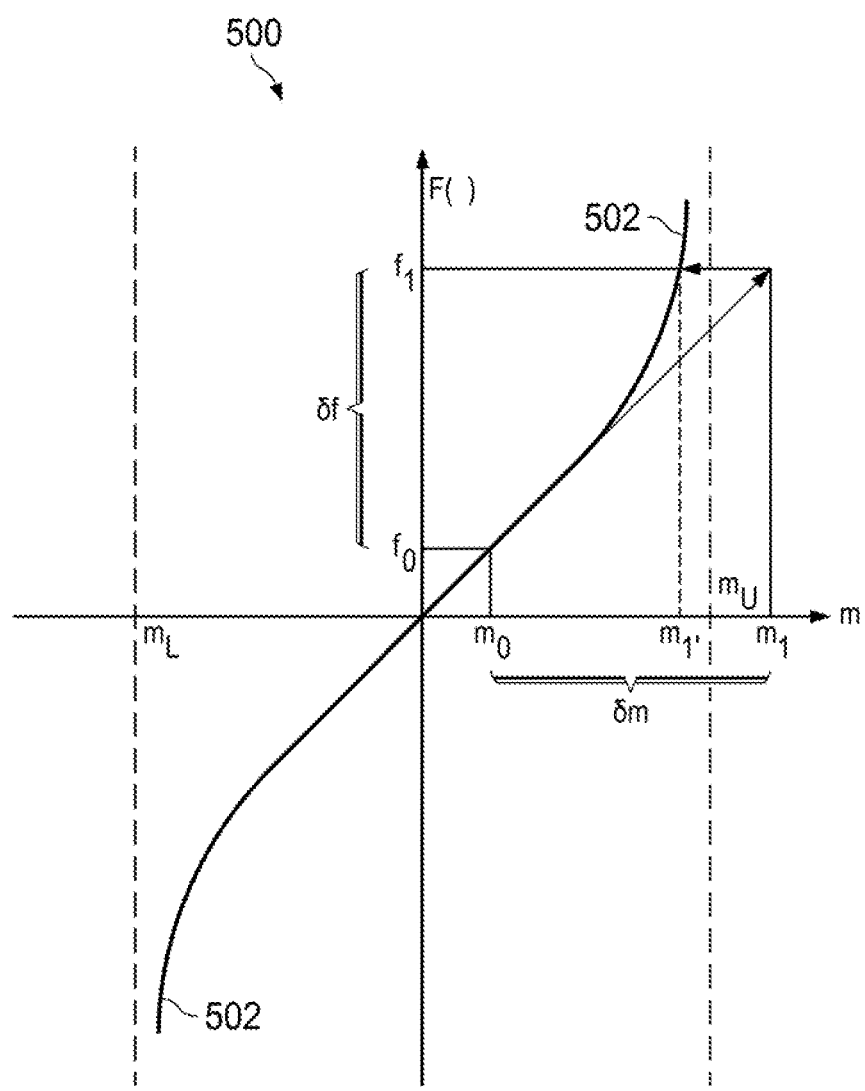
FIG. 5 is a graph of an illustrative depth adjustment function.

In some instances, the software 318 performing the inversion at step 410 may attempt to use z-coordinate values that fall outside of the boundaries of the velocity layer for which it is performing the inversion. In such instances, the software applies an inequality constraint technology such as that described by Kim et al., *Inequality Constraint in Least-Squares Inversion of Geophysical Data*, Earth Planets Space, 51, pp. 255-259, 1999 to determine a new z-coordinate value that falls within the boundaries of the appropriate velocity layer, and this new z-coordinate is used in lieu of the z-coordinate that falls outside of the velocity layer. FIG. 5 is a graph 500 demonstrating the z-coordinate adjustment technique. The curve 502 is represented by a function F(m):

$$F(m) = \log_e \frac{m - m_L}{m_U - m}, \quad m_L < m < m_U \quad (3)$$

where $m_L$ and $m_U$ are the lower and upper z-coordinate boundaries, respectively, for the pertinent velocity layer, and m is distance of the event from the middle of the layer, or $z_E - (m_U - m_L)/2$, where $z_E$ is the z-coordinate of the event being constrained between the lower and upper boundaries. If the iterative method updates the event's vertical position from, e.g., $m_0$ to $m_1$, the updated vertical position may be adjusted to $m_1$, as follows:

$$m_{1'} = \frac{m_L(m_U - m_0) + m_U(m_0 - m_L)e^{\delta f}}{(m_U - m_0) + (m_0 - m_L)e^{\delta f}} \quad (4)$$

where $$\delta f = \frac{m_U - m_L}{(m - m_L)(m_U - m)} \delta m \quad (5)$$

The value m is initially selected to be zero to locate the event in the middle of the given velocity layer and updated to minimize the misfit, subject to the given constraints for each layer.

The method 400 then determines whether the current value of iteration counter i is equal to N, signifying that an inversion and a final misfit calculation have been performed for each of the N layers (step 416). If not, the counter i is incremented by one (step 418) and control of the method 400 returns to step 410.

As explained above, at step 408 the initial x, y and $t_0$ values are set based on the events that occurred during the hydraulic fracturing process—namely, creation of the perforation 202 and injection of high-pressure fluid into the well 110. These values are repeatedly refined during the inversion process at step 412 until a minimum misfit (or a misfit that meets or falls below a predetermined threshold) is achieved for velocity layer 320. When the iteration counter i is incremented at step 418 and the iterative inversion routine is repeated for the next velocity layer (e.g., layer 322), the x, y and $t_0$ values may be set in different ways. In some embodiments, the x, y and $t_0$ values from the final inversion calculation at step 412 for the prior layer (e.g., layer 320) may be set as the initial x, y and $t_0$ values for the inversion process for the new layer (e.g., layer 322). An assumption underlying this approach is that the x, y and $t_0$ values that produced the smallest possible misfit for layer 320 would be the best starting point at which to perform inversion for the layer 322. In other embodiments, the x, y coordinates and event origin time to may be reset to their original values. In either embodiment, however, the end result—i.e., the x, y, z and $t_0$ values that produce the minimum misfit for layer 322—will be the same.

In this way, x, y, z and $t_0$ values are identified for each of the velocity layers 320, 322, 324, 326 and 328 such that a minimum misfit is determined for each of the layers. The minimum misfit values are then compared across the velocity layers (step 420) to identify the layer that corresponds to the smallest misfit value. The layer identified at step 420 is associated with x, y, z values that most closely approximate the three-dimensional point in space at which the microseismic event occurred and the to value that most closely approximates the time at which the microseismic event originated. Thus, the identified layer is designated as being the best estimate as to the location and time of the microseismic event (step 422). The method 400 may be repeated for each microseismic event of interest. The scope of disclosure is not limited to the specific steps shown in FIG. 4. On the contrary, the method 400 may be modified as desired, including by adding, removing or modifying the steps described above.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

The following is claimed:

1. A method for locating a microseismic event in a subsurface formation, comprising:
   receiving a microseismic signal at a detector;
   obtaining a velocity model representative of the subsurface formation, the velocity model comprising multiple velocity layers;
   for each of the multiple velocity layers in the subsurface formation, generating a separate estimated microseismic event location and microseismic event origin time; and
   selecting one of the estimated locations and times from among the different estimated microseismic event locations and event origin times using a parameter of the microseismic signal received at the detector.

2. The method of claim 1, wherein said estimating comprises performing a plurality of inversion processes, the plurality of inversion processes including an inversion process for each of said multiple velocity layers.

3. The method of claim 2, wherein performing said inversion process comprises determining an event location and an event origin time that produce a misfit that meets or falls below a predetermined threshold.

4. The method of claim 2, further comprising using a location of a perforation shot in a well to perform said inversion process.

5. The method of claim 2, further comprising using a depth in the middle of at least one of the multiple velocity layers to perform said inversion process for said at least one of the multiple velocity layers.

6. The method of claim 2, wherein performing the inversion process for at least one of said multiple velocity layers comprises using the inversion model ax=b, wherein "a" comprises a sensitivity matrix associated with said at least one of the multiple velocity layers, "x" comprises a vector that includes the estimated location and time for said at least one of the multiple velocity layers, and "b" includes an arrival time vector that includes a calculated arrival time for the microseismic signal.

7. The method of claim 1, wherein the parameter comprises an arrival time of the received microseismic signal at the detector, and wherein said selecting comprises determining an absolute value of a difference between said arrival time and a calculated arrival time.

8. The method of claim 7, further comprising using the selected one of the estimated locations and times to calculate the calculated arrival time.

9. The method of claim 1, wherein estimating the microseismic event location for each of the multiple velocity layers comprises constraining a depth component of the microseismic event location to said each of the multiple velocity layers.

10. A method for locating a microseismic event, comprising:
    lowering a microseismic detector into a well in a formation;
    using the microseismic detector to receive a microseismic signal generated by the microseismic event, the signal received at an arrival time;
    for each of multiple velocity layers within the formation, generating separate estimated spatial coordinates and estimated event origin times by performing a linear inversion associated with each of the multiple velocity layers; and
    selecting from among the estimated spatial coordinates and estimated event origin times based on a difference between said arrival time and an expected arrival time associated with the selected estimated spatial coordinates and event origin time.

11. The method of claim 10, wherein performing the linear inversion for at least one of the multiple velocity layers comprises:
    initializing a depth component of the estimated spatial coordinates to a midpoint of said at least one of the multiple velocity layers; and
    initializing non-depth components of the estimated spatial coordinates to a location associated with a casing perforation in another well.

12. The method of claim 10, wherein performing the linear inversion for at least one of the multiple velocity layers comprises repeatedly modifying the estimated spatial coordinates and event origin time.

13. The method of claim 10, wherein performing the linear inversion for at least one of the multiple velocity layers comprises constraining a depth component of the estimated spatial coordinates to said at least one of the multiple velocity layers.

14. The method of claim 10, wherein performing said linear inversion comprises using an inversion model of ax=b, wherein "a" comprises a matrix associated with a velocity model, "x" comprises a vector containing the estimated spatial coordinates and event origin time, and "b" comprises a vector containing expected arrival times for compression waves and shear waves forming the microseismic signal.

15. A system to determine a location and a time of a microseismic event in a formation, comprising:
a microseismic detector to determine an arrival time of a microseismic signal generated by the event; and
processing logic, in communication with the tool, to generate a plurality of estimates of a time and location of the event, each estimate corresponding to one of a plurality of velocity layers in the formation,
wherein the processing logic uses the arrival time to select one of the plurality of estimates of times and locations.

16. The system of claim 15, wherein the microseismic detector comprises one or more geophones.

17. The system of claim 15, wherein the microseismic detector is disposed in a location selected from the group consisting of a well within said formation and a surface of said formation.

18. The system of claim 15, wherein the processing logic estimates said times and locations using a linear inversion model that accounts for properties of said plurality of velocity layers.

19. The system of claim 15, wherein, to select said one of the estimated times and locations, the processing logic calculates an absolute value difference between said arrival time and a calculated arrival time for each of the plurality of velocity layers in the formation.

20. The system of claim 19, wherein, to select said one of the estimated times and locations, the processing logic identifies the lowest absolute value difference among the absolute value differences calculated for each of the plurality of velocity layers in the formation.

* * * * *